United States Patent [19]
Igl et al.

[11] Patent Number: 5,764,839
[45] Date of Patent: Jun. 9, 1998

[54] BEND RADUS CONTROL JACKET WITH MATRIX OF ENGAGING ELEMENTS

[75] Inventors: Scott Anthony Igl, St. Paul; Gordon Dwight Henson, Lake Elmo; Nicholas Anthony Lee, Woodbury, all of Minn.

[73] Assignee: Minnesota Mining and Manufacturing Company, St. Paul, Minn.

[21] Appl. No.: 662,720

[22] Filed: Jun. 10, 1996

[51] Int. Cl.$^6$ ..................................... G02B 6/44
[52] U.S. Cl. .................. 385/114; 385/147; 385/100
[58] Field of Search ..................... 24/339; 411/508; 385/100–114, 147

[56] References Cited

U.S. PATENT DOCUMENTS

| | | | |
|---|---|---|---|
| 4,645,295 | 2/1987 | Pronovost | 350/96.2 |
| 4,931,332 | 6/1990 | Duksrt et al. | 428/50 |
| 5,030,135 | 7/1991 | Plesinger | 439/447 |
| 5,094,552 | 3/1992 | Monroe et al. | 385/76 |
| 5,340,330 | 8/1994 | Dolson et al. | 439/447 |
| 5,390,262 | 2/1995 | Repta et al. | 385/100 |
| 5,460,540 | 10/1995 | Reichle | 439/445 |
| 5,477,969 | 12/1995 | Beeskau et al. | 211/87 |

FOREIGN PATENT DOCUMENTS

| | | | |
|---|---|---|---|
| 2 040 062 | 8/1980 | United Kingdom | G02B 7/26 |
| WO 93/09457 A1 | 5/1993 | WIPO | G02B 6/44 |

*Primary Examiner*—John Ngo
*Attorney, Agent, or Firm*—Nestor F. Ho; H. Sanders Gwin, Jr.

[57] ABSTRACT

A control jacket houses a line, such as a fiber optic ribbon cable or other conductor, and limits the amount of bending and twisting movement of the line. The jacket preferably includes a multi-dimensional matrix of engagement elements separated by a plurality of gaps and connected by an underlying web structure. As the jacket is bent or twisted, adjacent engagement elements move together into engagement with each other, limiting the bend radius or twist angle of the jacket, and thus of the fiber optic ribbon cable or other protected line. The jacket preferably includes at least one fastening mechanism, allowing the control jacket to be opened along its length for easy insertion and removal of the line as needed. Multiple jackets can be placed end-to-end along the line, to create a composite jacket of any desired length.

45 Claims, 10 Drawing Sheets

5,764,839

BEND RADIUS CONTROL JACKET WITH MATRIX OF ENGAGING ELEMENTS

STATEMENT OF FEDERALLY SPONSORED RESEARCH AND DEVELOPMENT

The U.S. government has a paid-up license in this invention and the right in limited circumstances to require the patent owner to license others under reasonable terms as provided for by the terms of Cooperative Agreement Award No. 70NANB4H1521 awarded by the National Institute of Standards and Technology (NIST).

BACKGROUND OF THE INVENTION

1. Field of the Invention

The invention relates to cable protectors, and more particularly, to jacket-type cable protectors that at least partially surround a cable to limit its movement.

2. Description of Related Art

Light-transmitting fiber optic cables enjoy a variety of uses and applications, in a wide range of technologies. Telephonic communications, computer data transmission, and laser applications are a few examples, and the number of uses is rapidly increasing. Fiber optic cable's small size and high-quality transmission characteristics are of course very advantageous and desirable.

In a fairly common optical fiber configuration, a number of individual fibers are placed side-by-side in a relatively flat ribbon cable, for example a 20-fiber ribbon cable. The ends of the fiber are inserted into connectors, for attachment to, e.g., mainframe computers or other devices. In one particular application, adjacent individual fibers are sandwiched between two tape layers to form the ribbon cable. Of course, round cables and cables of other geometric configurations are also available. Of course, round cables and cables of other geometric configurations are also available.

Fiber optic cables usually demonstrate high flexibility, allowing them to be manipulated and routed between and around various devices and/or obstacles. However, it is well known that stressing optical fibers by, e.g., bending or twisting can cause severe physical damage, e.g., fatigue or breakage, either immediately or after passage of time. Transmission degradation, such as power attenuation, bandwidth change, etc., also can occur. Depending on the type of fiber, transmission speed, and/or light wavelength, even minimal tensile stress can adversely affect the cable.

Strain relief systems for optical fiber cables are known in the art. U.S. Pat. No. 5,390,272 to Repta et al., for example, which is incorporated herein by reference, shows a strain relief sheath for connection to the backside of a fiber optic connector. The sheath includes a number of engaging spaced ribs, which limit the minimum bend radius of the fiber optic cable in the vicinity of its connection point to the connector. U.S. Pat. No. 5,094,552 to Monroe et al., which is incorporated herein by reference, shows a similar strain-relief device for coupling a fiber optic cable to a connector. The Monroe strain-relief boot includes a staggered series of openings, with interlocking tongue-and-groove connection elements. Finally, WO 9309457-A1, which is incorporated herein by reference, discloses an optical fiber sheath having annular or helical circumferential grooves to limit the maximum bend radius.

These prior art devices suffer a number of significant disadvantages. For example, the disclosed sheaths are not well-suited to limit twisting movement of the underlying cable. Feeding the cable from one device to another in some environments may require twisting, which risks stressing the cable and impairing its strength and/or light-transmission characteristics. The prior art devices either allow unrestricted twisting to occur, or prevent such twisting movement in a manner that could place undue strain on the fibers within the cable within the sheath. Thus, prior art sheaths are either inconvenient to manipulate or unlikely to prevent cable damage upon twisting.

Another significant disadvantage of the prior art exists in that the sheaths must slide longitudinally over the fiber optic cable and/or the associated connector(s) in order to be used. Thus, installing the sheaths requires "threading" the sheaths onto the cables prior to connector installation. Similarly, sheath removal requires removing the connector from the cable, cutting the cable, or cutting the sheath, which of course disrupts use of the connected devices and/or damages the underlying cable.

A further disadvantage lies in that the prior art sheaths allow exposure of their underlying cables to the outside environment, not only beyond their intersection with the cables, but also, in the case of U.S. Pat. No. 5,094,552 discussed above, directly through the openings in the sheaths. This environmental exposure risks contaminating or otherwise damaging the cables.

Finally, the prior art devices are designed for round fiber optic cables instead of the flat, ribbon cables preferred in many situations.

In view of these disadvantages, a need has arisen for a cable protection device that allows bending and twisting but limits twist angle and bend radius, allows easy installation and removal, protects against environmental contamination, and accommodates flat ribbon cables.

SUMMARY OF THE INVENTION

To overcome the disadvantages described above, a control jacket according to embodiments of the invention houses a line, such as an optical fiber or fiber optic cable, and limits the amount of both bending and twisting movement imparted to the line. A multi-dimensional matrix of engagement elements substantially covers the line, and a plurality of gaps separates adjacent engagement elements of the matrix. The elements engage each other upon bending and twisting movement of the jacket. This engagement limits the ultimate bending and twisting of the jacket, preventing damage to the line.

According to one embodiment, the matrix of engagement elements includes a number of rows and columns. Adjacent engagement elements in the same row and/or the same column engage each other upon twisting of the jacket and/or bending of the jacket in an out-of-plane direction. According to one embodiment, longitudinally adjacent engagement elements at least partially close their respective intervening gaps and engage each other upon out-of-plane bending of the jacket along its longitudinal direction, and in-plane transversely adjacent engagement elements at least partially close their respective intervening gaps and engage each other upon out-of-plane bending of the jacket along its in-plane transverse direction. Additionally, adjacent engagement elements engage each other upon in-plane bending of the jacket.

According to another aspect of the invention, the jacket can be opened along its longitudinal direction to allow application or insertion onto the fiber optic cable or other line being protected. Similarly, the jacket can be closed along its longitudinal direction for securement of the line within the jacket.

According to one embodiment, the structure allowing the opening/closing movement includes first and second zipper fasteners extending along opposite sides of the jacket. The jacket according to this embodiment comprises two portions, for example identical half portions, which are engaged and disengaged by the zipper fasteners. Another embodiment uses only one zipper fastener with hinge structure opposite the zipper fastener to pivot the two portions of the jacket with respect to each other.

The line to be protected can comprise a ribbon cable, for example a fiber optic ribbon cable, a fiber optic cable of other geometry, and/or electrically conductive wire of various geometries, to name a few examples. According to the embodiment in which the jacket is openable and closeable along its length, the jacket is attachable to the line at randomly accessed points along its length, not just by threading it over the end of the line. Thus, the jacket can be applied to provide protection at any point along the length of the line where potential damage due to bending or twisting is anticipated. Further, with one embodiment, multiple interconnected jackets can be disposed along the line to protect a line of any length.

BRIEF DESCRIPTION OF THE DRAWINGS

Preferred embodiments of the invention will be described with respect to the figures, in which like reference numerals denote like elements, and in which.

DETAILED DESCRIPTION OF PREFERRED EMBODIMENTS

Embodiments of the invention apply to a variety of technologies. For example, control jackets according to the invention can protect individual optical fibers or fibers grouped into a bundle or cable. Other wire-type or cable-type conductors are also protectable, e.g., copper wiring. Even fluid transmission lines, such as water, hydraulic or pneumatic lines, or flexible circuitry can also be protected. The term "line" will be used throughout the application to refer to the wide variety of fibers, wires, cables, hoses, and other devices that can be protected according to the invention, and, optionally, any insulating elements surrounding them.

Although control jackets according to the invention are particularly well-suited for lines having a flat, rectangular aspect ratio, the invention contemplates other line geometries as well. Moreover, embodiments of the invention can be used in a number of physical environments, including inter-computer connections, structures such as buildings or fuselages, underground, and under carpeting, for example.

Thus, although embodiments of the invention will often be described with respect to fiber optic ribbon cables, the invention is by no means limited to those embodiments.

Figure 1:
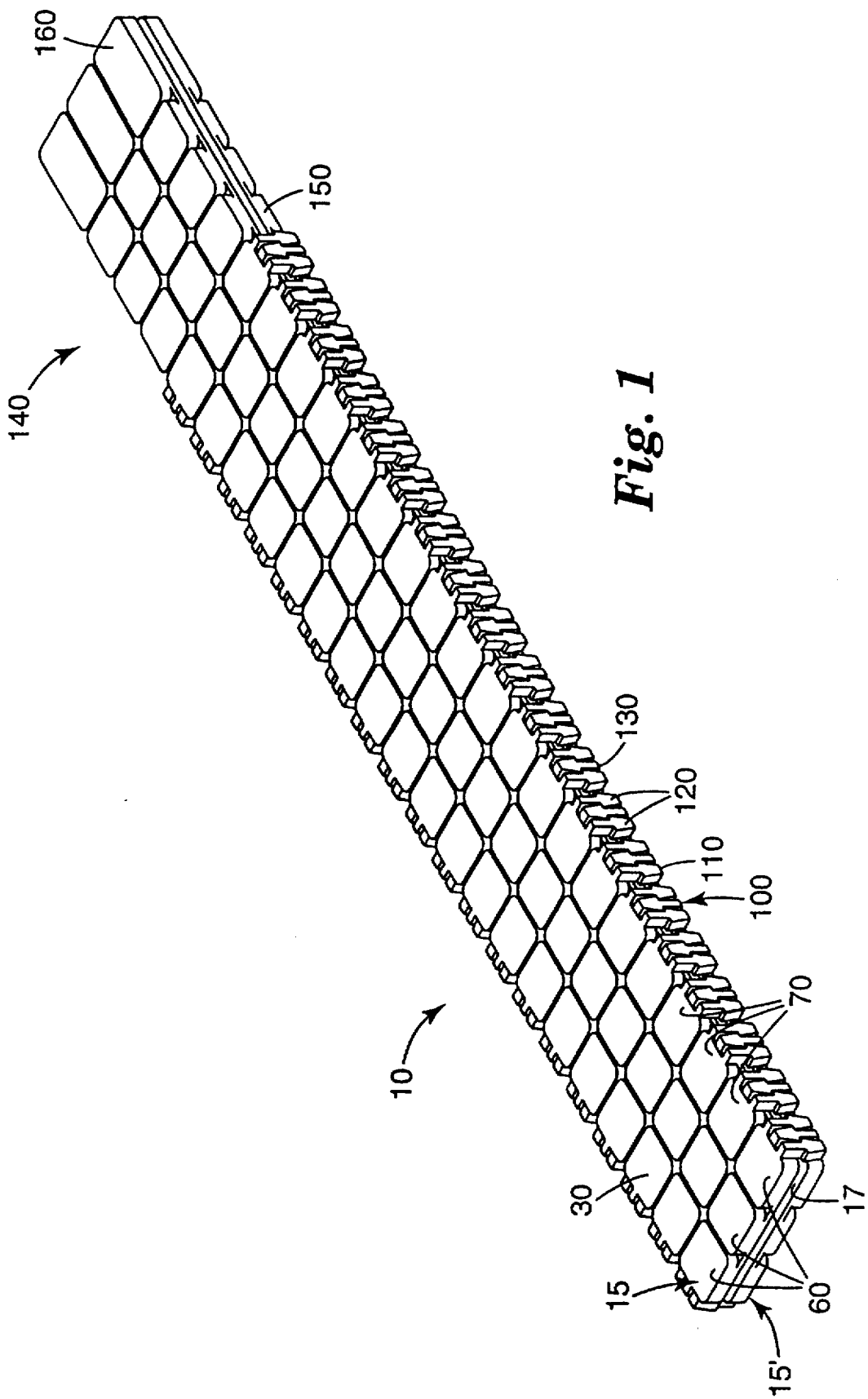
FIG. 1 is a perspective view of a control jacket according to an embodiment of the invention.
Figure 2:
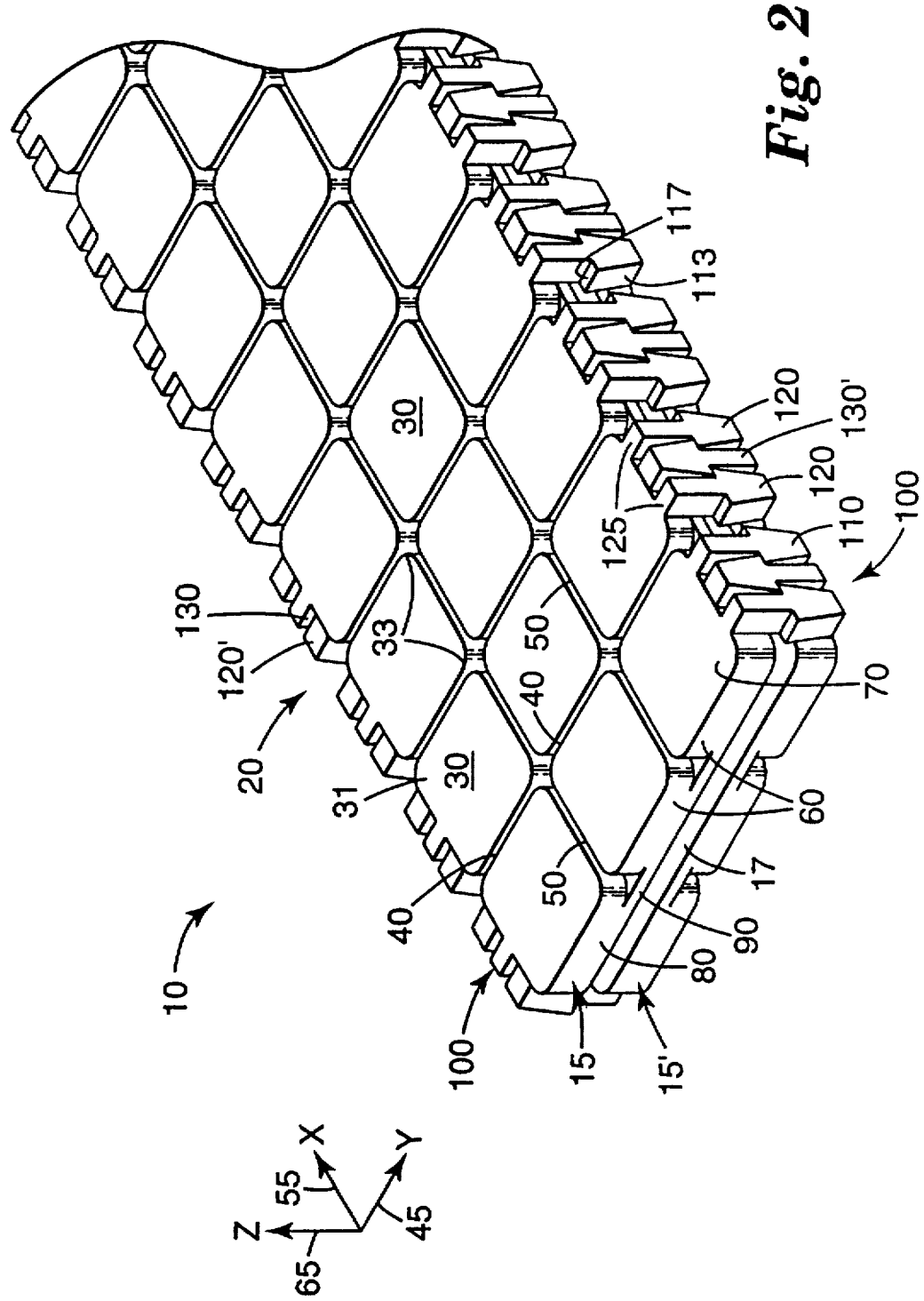
FIG. 2 is a close-up perspective view of the FIG. 1 control jacket.
Figure 3:
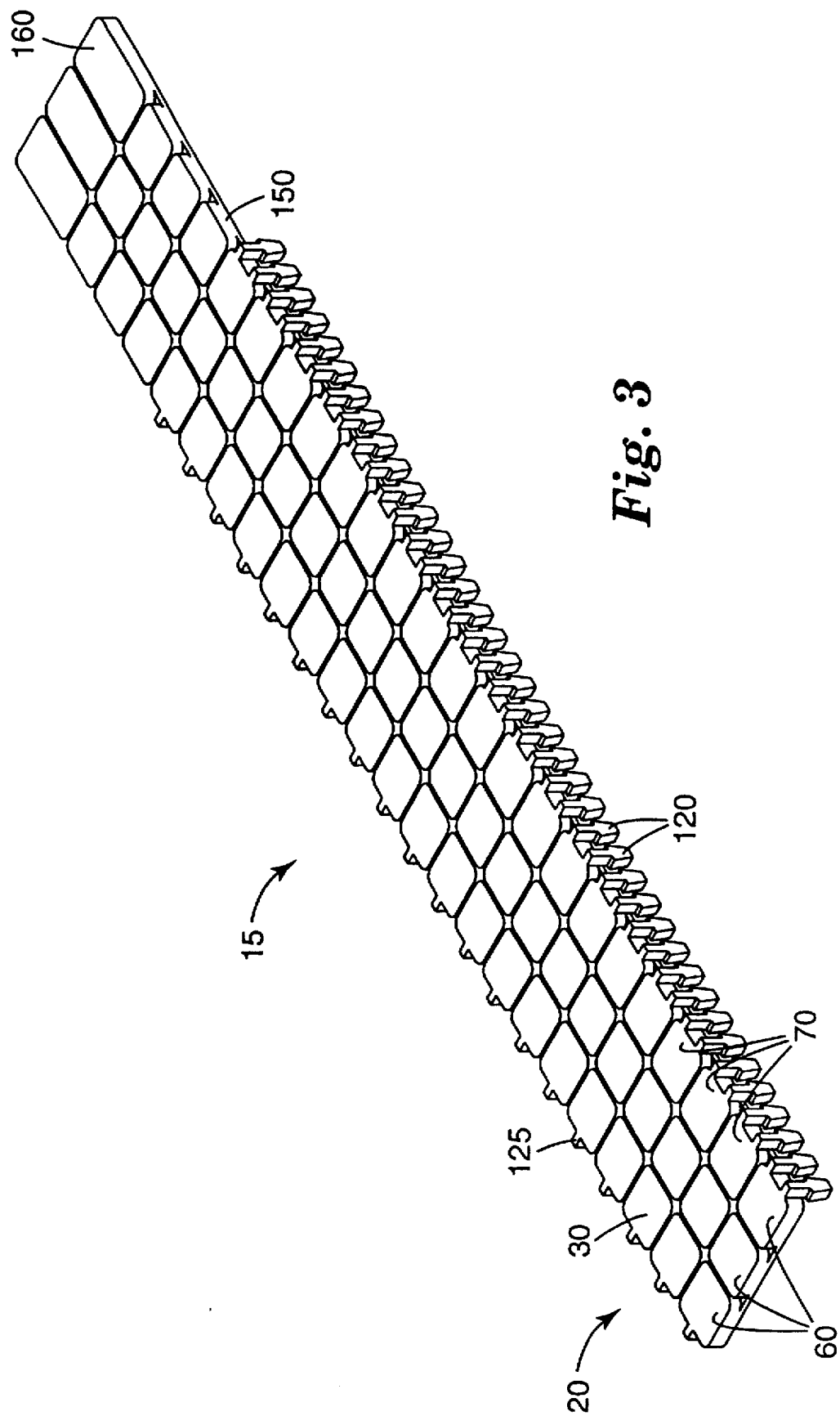
FIG. 3 is a perspective view of a portion of the FIG. 1 control jacket.

FIGS. 1–3 illustrate a first control jacket embodiment according to the invention. Jacket 10 preferably includes two, substantially identical jacket portions 15, 15', which are interlocked and disposed in an overlying relationship, as shown. To simplify the disclosure, only jacket portion 15 will be described in detail. Of course, jacket portions 15, 15' need not be identical, and need not divide jacket 10 into equal halves.

Jacket portions 15, 15' together define space 17 between them for accommodating a line to be protected. In the embodiment of FIGS. 1–3, a flat line, such as a flat fiber optic ribbon cable, is well-suited for space 17.

Both jacket portions 15, 15' include a plurality of engagement elements 30, sometimes called "wedges," disposed in a multi-dimensional matrix 20, as will be described. Engagement elements 30 each preferably include substantially flat, substantially polygonal faces 31 (FIG. 2) with straight edges 32 and rounded corners 33. Rounded corners 33 allow easier production of the mold for forming jacket portions 15, 15', and also allow greater movement of elements 30 to allow greater twisting movement, for example. Of course, right-angle or other types of corners can be used instead of rounded corners 33. As shown in the figures, elements 30 are substantially in the shape of a frustum of a pyramid.

Figure 4:
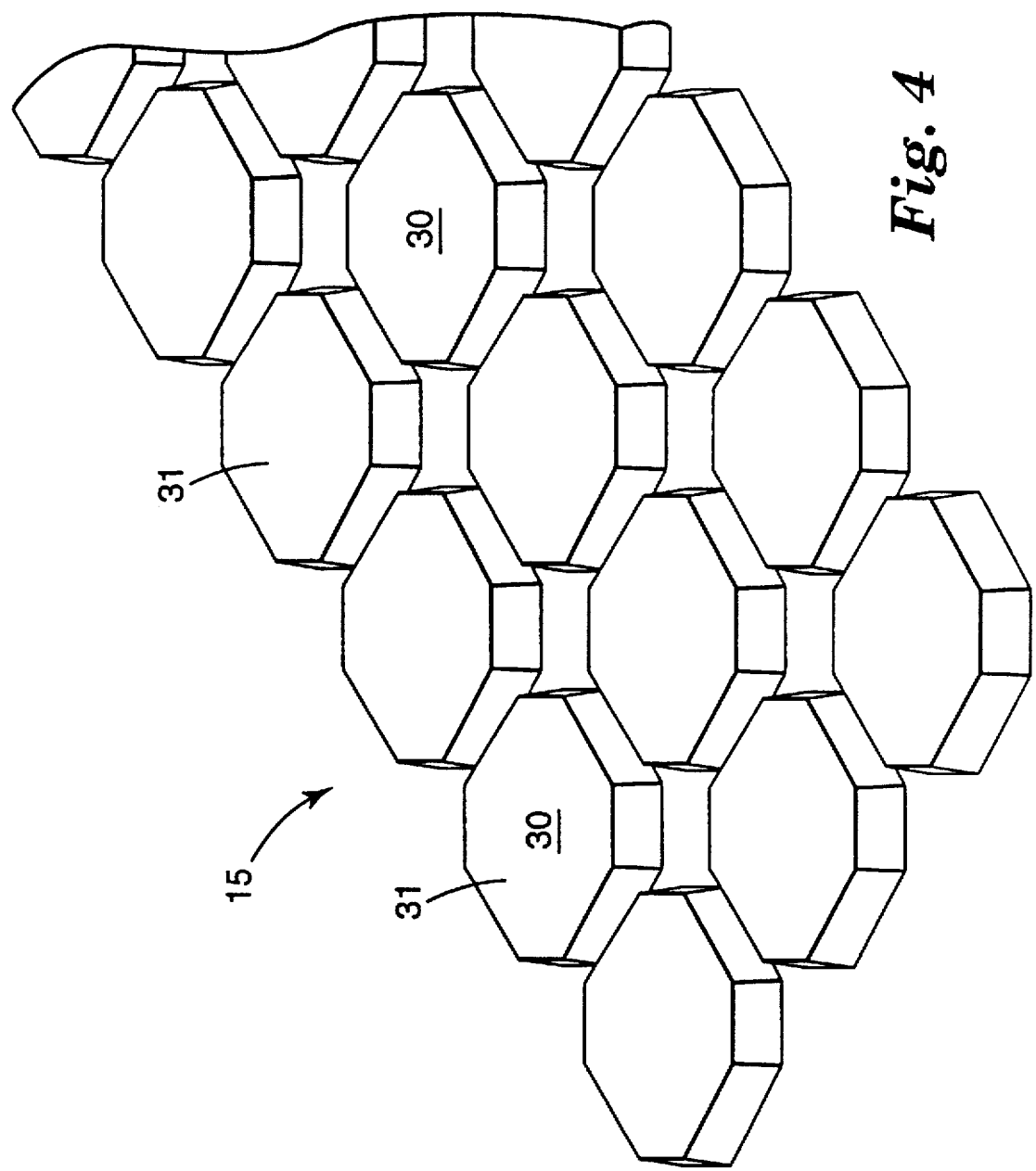
FIG. 4 is a perspective view of a control jacket having octagonal engagement elements, according to an embodiment of the invention.

Faces 31 of elements 30 need not be substantially square. As shown in FIG. 4, for example, engagement elements 30 of jacket portion 15 can include octagonal faces 31, which provide additional freedom of movement and control upon bending/twisting of jacket 10.

Engagement elements 30 are separated by gaps 40 preferably running in transverse direction 45, and by gaps 50 running in longitudinal direction 55. Of course, gaps running in diagonal or other directions are also contemplated. As jacket 10 absorbs bending and/or twisting forces, elements 30 of multi-dimensional matrix 20 move toward each other, ultimately engaging each other by at least partially closing gaps 40, 50 to limit the bend radius and twist angle of jacket 10, as will be described.

As shown in FIG. 2, longitudinal direction 55 can be considered an X direction and transverse direction 45 can be considered a Y direction, to define an XY plane of control jacket 10. For purposes of discussion, the XY plane can be considered the primary plane of jacket 10, and the terms "in-plane" and "out-of-plane" are taken with respect to the XY plane, unless otherwise noted. Additionally, second transverse direction 65, which in the illustrated embodiment runs vertically, can be considered a Z direction to define corresponding XZ and YZ planes.

Figure 11:
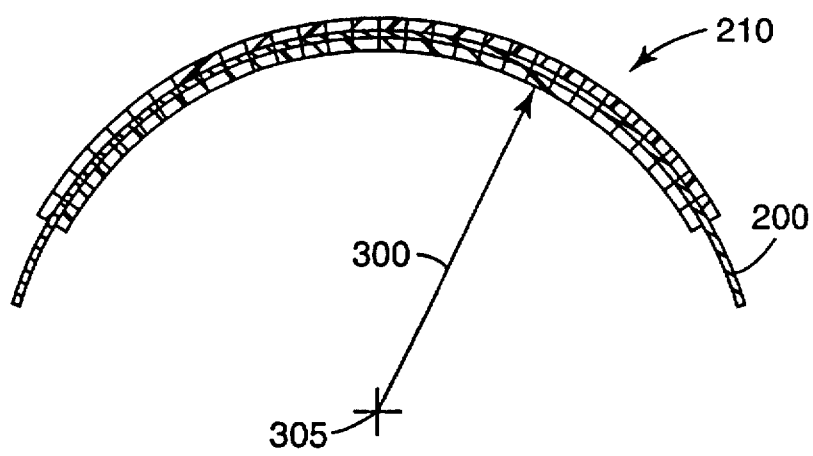
FIG. 11 is a cross-sectional view of the FIG. 10 control jacket in a bent configuration, according to an embodiment of the invention.

Jacket 10 can bend in these three planes. A bend in the XZ plane, as illustrated in, e.g., FIG. 11, is a bend out of the XY plane (i.e. an out-of-plane bend) along longitudinal direction 55. A bend in the YZ plane is an out-of-plane bend along transverse direction 45. A bend in the XY plane, that is an in-plane bend, is also possible but requires significant bending force, particularly with lines of relatively large width in transverse direction 45. Combinations of these bending movements are also possible, of course. Jacket 10 can also twist about an axis extending in longitudinal direction 55, for example a central longitudinal axis.

The term "multi-dimensional" matrix is intended to encompass all arrangements having elements extending in at least two directions, as opposed to a single-dimensional matrix or "array," which has elements running in only a single direction. Preferred embodiments of the invention include matrices having substantially identical rows and columns of elements, although other configurations are also contemplated.

According to the embodiment of FIGS. 1-3, matrix 20 includes three longitudinally running rows 60 and a large number of in-plane transversely running columns 70 of elements 30. Of course, other numbers of rows 60 and columns 70 are contemplated, depending on, e.g., the dimensional characteristics of the line to be protected.

As shown, rows 60 and columns 70 preferably are substantially linear, such that jacket portion 15 has a substantially rectangular overall shape. Other embodiments are contemplated, however. For example, rows 60 and/or columns 70 can be disposed in an arc about the line to be protected, to accommodate a line having a rounded geometry. With such an embodiment, engagement elements 30 could have arc-shaped outer faces 31 instead of substantially flat outer faces, forming the overall jacket 10 into a rounded, substantially cylindrical shape.

Each jacket portion 15, 15' preferably includes underlying web structure 80 for interconnecting engagement elements 30. Web structure 80 forms a plurality of hinge elements 90 directly underneath gaps 40, 50, allowing engagement elements 30 to bend with respect to one another and engage each other, as will be described. (Alternatively, for purposes of this description, engagement elements 30 can be considered to extend all the way to cavity 17, with hinge elements 90 being considered the structure interconnecting engagement elements 30.)

As jacket 10 bends out-of-plane along longitudinal direction 55, as shown in FIG. 11, for example, hinges 90 extending between adjacent engagement elements 30 within rows 60 allow elements 30 to move with respect to each other, into engagement. Adjacent elements in the same rows engage each other and ultimately limit the degree of longitudinal bend. Similarly, bending jacket 10 out-of-plane along transverse direction 45 causes adjacent elements 30 in columns 70 to move into engagement with each other, limiting the degree of transverse bend. In-plane bending of jacket 10 also causes adjacent elements 30 in columns 70 to engage each other, limiting (along with web structure 80 itself) the degree of in-plane bend. The degree of bend allowed by engagement elements 30 in a particular direction is called "bend radius," and will be described further in connection with FIG. 15, below.

Control jacket 10 also permits and limits twisting movement, that is, twist angle, without placing undue or damaging strain on any portion of jacket 10. One type of twisting movement involves turning one end of jacket 10 in one direction, say clockwise, and the other end of jacket 10 in an opposite direction, say counterclockwise, such that jacket 10 twists about a central longitudinal axis. Hinges 90 between engagement elements 30 absorb the strain imparted by this twisting movement, allowing engagement elements 30 to move together or apart as needed. For example, adjacent engagement elements 30 in columns 70 can engage each other upon twisting movement to limit the twist transmitted to the line.

Figure 5:
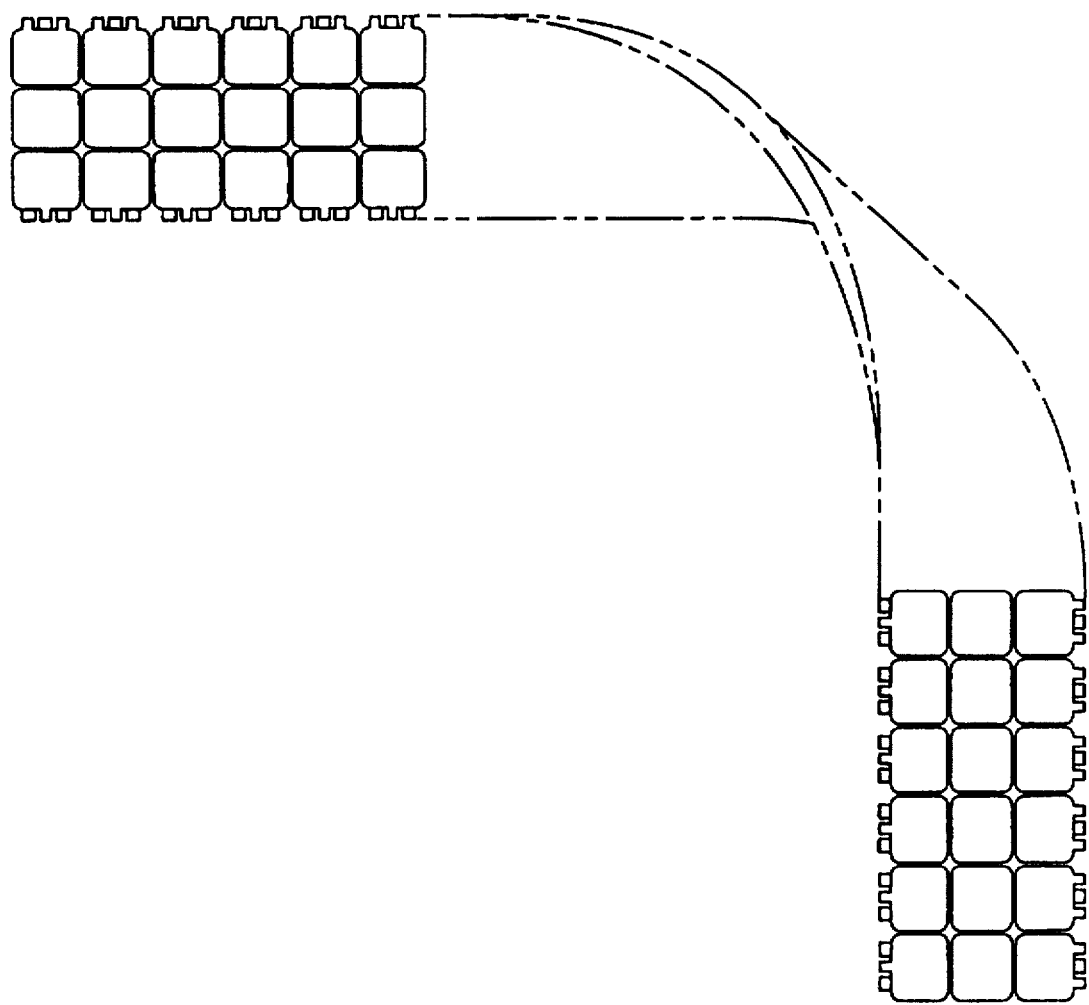
FIG. 5 is a perspective view of a control jacket bent and twisted into a desired shape, according to an embodiment of the invention.

During twist, underlying structure 80 (of which hinges 90 can be considered a part) can be thought of as a continuous web of relatively thin dimension. Engagement elements 30 are disposed on top of the web. Although web 80 twists relatively easily because of its relative thinness, engagement elements 30 prevent the web from twisting to the point of damaging the jacket or the underlying line. FIG. 5 illustrates jacket 10 under twisting strain.

According to the embodiment of FIGS. 1-3, fastening mechanism 100 joins jacket portions 15, 15' together. In the illustrated embodiment, fastening mechanism 100 comprises two zipper-type fasteners running longitudinally along opposite sides of jacket 10. Each fastener includes a plurality of latches or "teeth" 110. Jacket portion 15 includes downwardly extending teeth 120, integrally connected at 125 as one piece with respective engagement elements 30. Jacket portion 15', on the other hand, includes corresponding, upwardly directed teeth 130', also integrally connected as one piece with respective engagement elements, to interlock with downwardly depending teeth 120. Teeth 110 thus are interlocking members that engage and interlock with each other to hold jacket 10 closed. As shown, teeth 110 preferably include tapered surfaces 113 and abutment surfaces 117 to promote easy interlocking of teeth 110, although of course other tooth geometries will be apparent to those of ordinary skill.

According to the illustrated embodiment, jacket portions 15, 15' are identical. Thus, downwardly extending teeth 120 of jacket portion 15 correspond to upwardly extending teeth 120' of jacket portion 15', on the opposite side of jacket 10. Similarly, downwardly extending teeth 130 of jacket portion 15 correspond to upwardly extending teeth 130' of jacket portion 15'.

Also according to the illustrated embodiment, jacket portions 15, 15' are attached only along the first and second zipper-type fasteners of fastening mechanism 100, not towards the center of space 17. Therefore, the line held within space 17 between jacket portions 15, 15' can slide freely, or "float," within jacket 10, allowing relative motion between jacket 10 and the line. This design presents a significant advantage. If the line were continuously secured to or in fixed abutting relationship with jacket 10 down its entire length and across space 17, it would be subjected to shear forces generated by the bending of the jacket, and thus potentially damaged. By securing jacket 10 to the line at only one end, as will be described, bending and twisting of the line is constrained and yet the line can slide relative to the jacket, eliminating potentially damaging build-up of shear forces.

Teeth 110 preferably are disposed on opposite sides of transversely extending gaps 40. Because teeth 110 do not interlock with each other across gaps 40, teeth 110 and engagement elements 30 move substantially independently. Keeping the movement of engagement elements 30 and teeth 110 independent allows engagement elements 30 to control the bend radii and twist angle, instead of teeth 110.

In other words, teeth 110 are spaced closely enough to not readily disengage upon bending or twisting, but have enough play so that elements 30 determine the bend radius, not teeth 110.

As shown in, e.g., FIG. 1, control jacket 10 includes end portion 140, which is specifically designed for attachment to a connector (not shown). End portion 140 preferably includes an area 150 that is free of interlocking members 110. In the illustrated embodiment, end elements 160 are approximately twice the length of the other engagement elements 30, but of course can be any desired length.

According to one embodiment, end portion 140 is adhered directly onto the connector and/or the line, to prevent jacket 10 from sliding down the line. Jacket portions 15, 15' are preferably fastened together with adhesive at end portion 140, promoting a stronger bond and lessening the likelihood of inadvertent separation from each other or from the connector. Different possible types of adhesive will be described below. Jacket 10 thus advantageously protects the transition point in the line at the connector, a point that typically must endure high stress and thus is often subject to damage.

Alternatively, instead of or in addition to using end portion 140, jacket 10 can merely be broken off or cut along one of the transverse gaps 40, or, for that matter, along a longitudinal gap 50, to form a jacket of desired size for connection to the connector or other external element.

Figure 6:
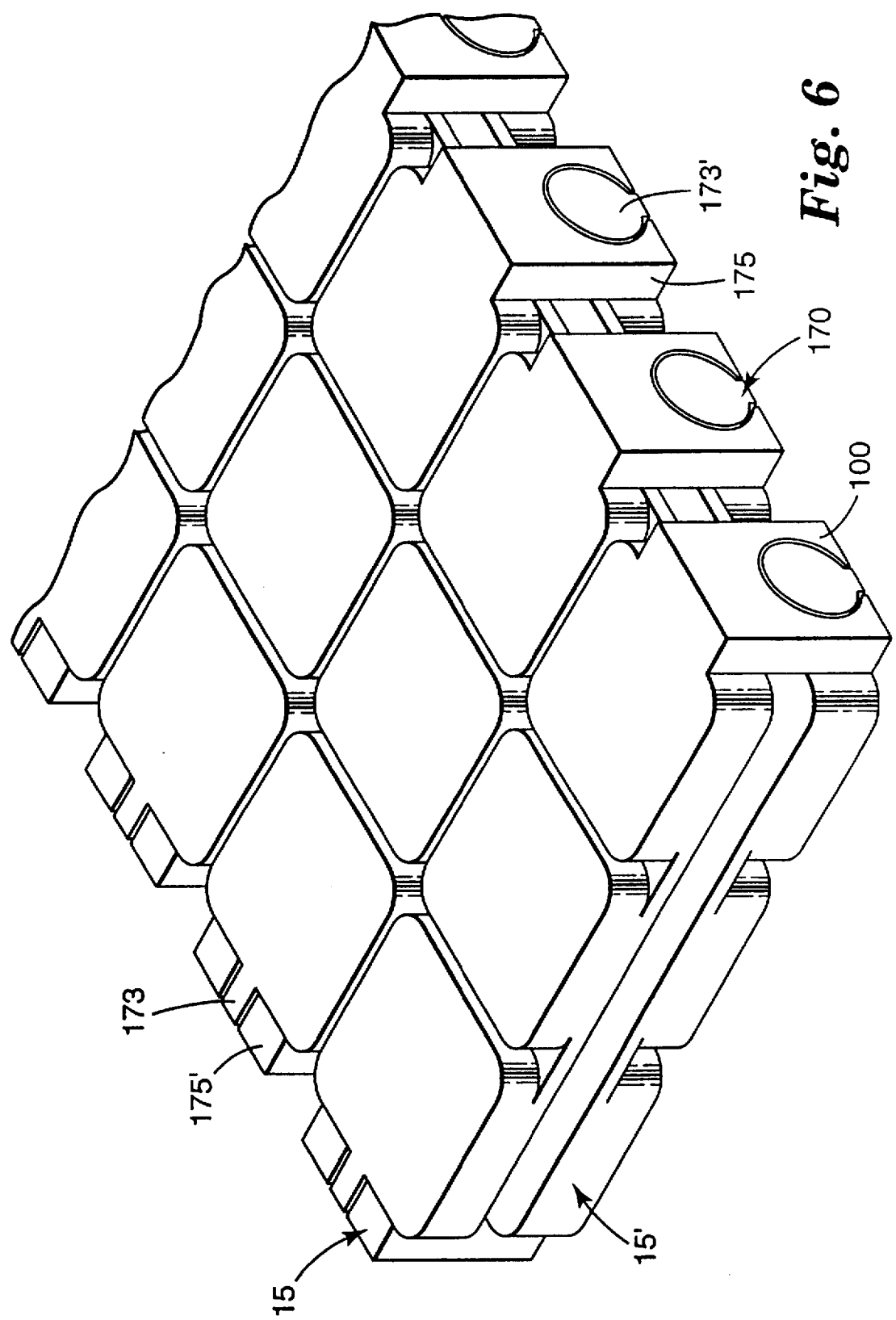
FIG. 6 is a perspective view of an alternative fastening mechanism according to an embodiment of the invention.
Figure 7:
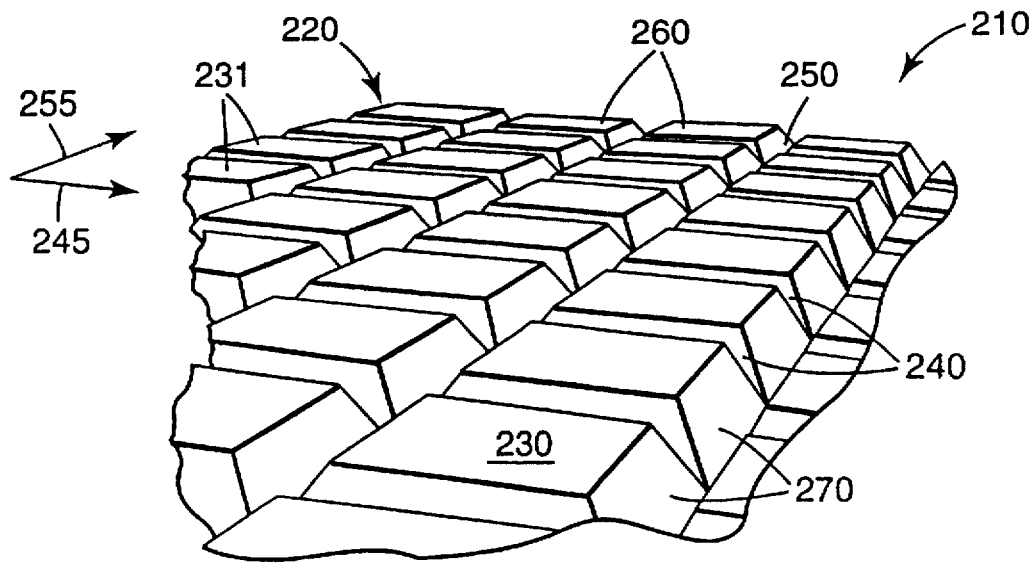
FIG. 7 is a perspective view of a control jacket portion according to an alternative embodiment of the invention.

Instead of the interlocking elements specifically illustrated in FIGS. 1–3, other types of fastening mechanisms can be used to fasten jacket portions 15, 15' together. FIG. 6, for example, illustrates tongue-and-groove joints 170. Jacket portion 15 includes downwardly extending groove elements 175, for engagement with upwardly extending tongue elements 173' of jacket portion 15'. As with previous embodiments, jacket portions 15, 15' preferably are of identical shape, such that the downwardly extending groove elements 175 of jacket portion 15 correspond to upwardly extending groove elements 175' of jacket portion 15', on the opposite side of jacket 10. Similarly, tongue elements 173, 173' correspond to each other. Other mechanical fastening mechanisms, for example ball-and-socket mechanisms, will be apparent upon reading this description.

Alternatively, an adhesive can permanently secure jacket portions 15, 15' together along their opposite edges. A wide variety of adhesives can be used, for example a liquid adhesive extruded longitudinally along the jacket portions, and/or a pressure-sensitive, fast-curing or hot melt adhesive, and/or an adhesive tape with a paper backing, such as an acrylic transfer adhesive. With this latter example, lines of tape would be affixed to one of the jacket portions 15, 15', and the paper backing left in place until use, protecting the tape from contamination. Jacket portions 15, 15' would be moved into position around the line to be protected, the paper backing removed, and the jacket portions then adhered together to secure the line within space 17. By adhering jacket portions 15, 15' together only along their edges, by tape or whatever means, the line can "float" within jacket 10 as described earlier. Of course, adhesive can also be applied entirely across space 17 if desired for a particular application.

Alternatively, fastening mechanism 100 can include one or more weld joints longitudinally extending along jacket 10. According to this embodiment, one or more edges of jacket 10 are heated to melt jacket portions 15, 15' together. Alternatively, one could ultrasonically weld the edges of jacket 10 to hold the jacket portions 15, 15' together.

Although this would provide a permanent and thus unopenable seal, the enhanced strength achieved may have usefulness in some applications.

Figure 8:
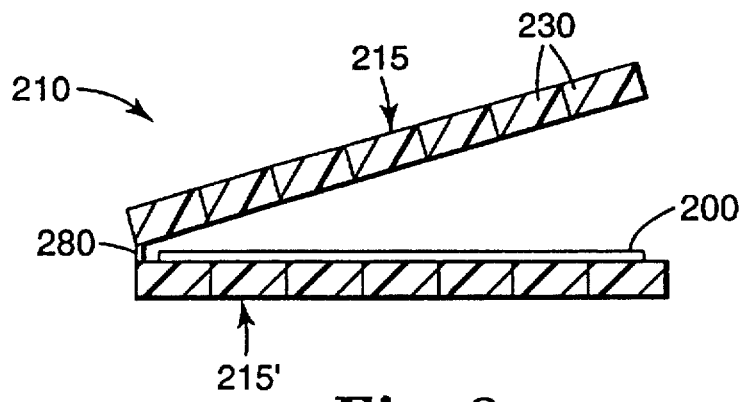
FIG. 8 is a cross-sectional view of the FIG. 7 control jacket in an opened configuration.
Figure 9:
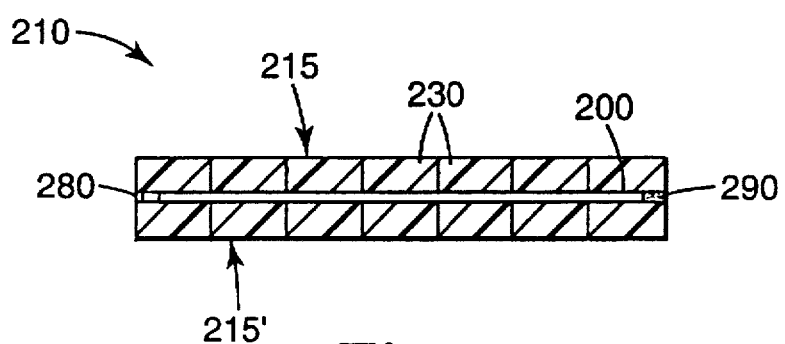
FIG. 9 is a cross-sectional view of the FIG. 7 control jacket in a closed configuration.

FIGS. 7–11 illustrate an additional embodiment according to the invention. FIGS. 8–9 in particular illustrate one significant feature of this embodiment relative to the embodiment of FIGS. 1–3: one of the fastening mechanisms is replaced by hinge 280. Hinge 280 pivots jacket portions 215, 215' relative to each other to open and close jacket 210. Hinge 280, as well as hinges 90 between adjacent engagement elements 30, preferably are "living" hinges, meaning that they are formed of a material and thickness that allow repeated bending without damage.

When jacket 210 is opened, line 200, which in the illustrated embodiment is a fiber optic ribbon cable, is inserted. Adhesive 290 then can be extruded along the edge of jacket 210 opposite hinge 280, to fasten jacket portions 215, 215' together. Alternatively, in place of extruded adhesive 290, jacket 210 can include adhesive tape or a plurality of interlocking members, such as members 110 in the embodiment of FIGS. 1–3, for example.

As with the embodiment of FIGS. 1–3, jacket 210 includes a multidimensional matrix 220 of engagement elements 230. Engagement elements 230 are separated by gaps 240, 250 and disposed in rows 260 and columns 270 along longitudinal and transverse directions 255, 245. The geometry of elements 230 differs from those of FIGS. 1–3, in that elements 230 include slanted side surfaces instead of straight side surfaces, and include faces 231 having sharp corners instead of rounded ones.

Figure 10:
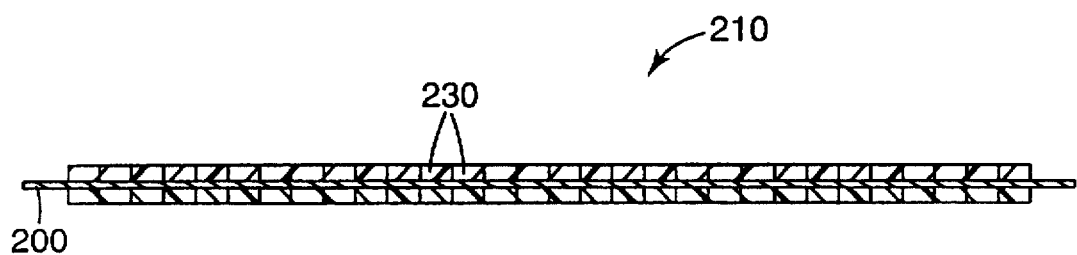
FIG. 10 is a cross-sectional view of a control jacket in a straight configuration, according to an embodiment of the invention.

FIG. 10 illustrates jacket 210 in a straight configuration, and FIG. 11 illustrates a bent configuration with minimum bend radius 300 about center point 305. Bend radius will be described below with reference to FIG. 15.

Figure 12:
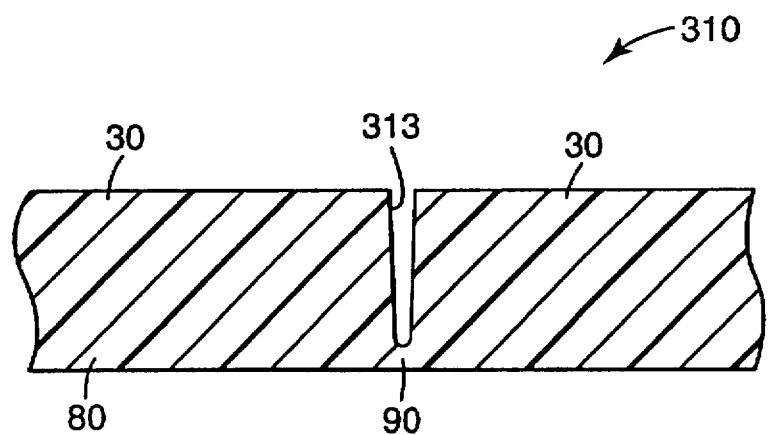
FIGS. 12–14 are cross-sectional views of gaps between engagement elements of a control jacket, according to embodiments of the invention.
Figure 13:
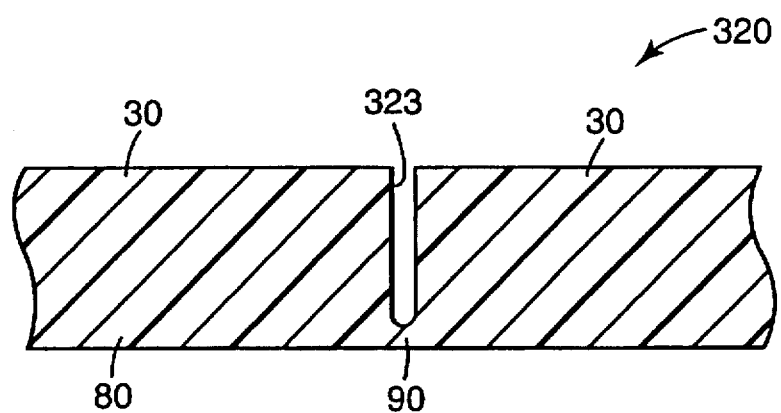
Figure 14:
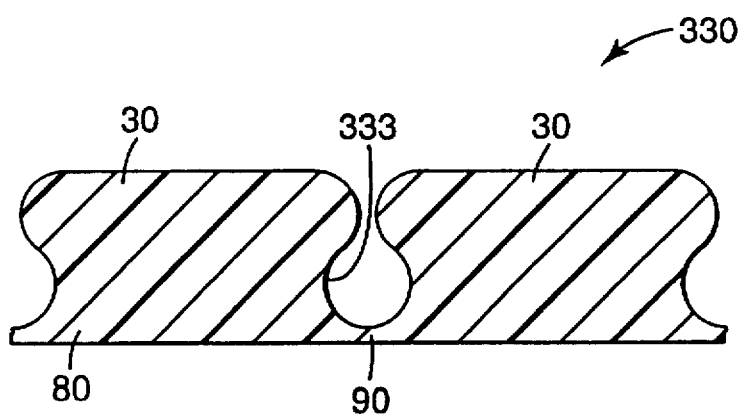

FIGS. 12–14 show different examples of the gaps possible between adjacent engagement elements. In FIG. 12, for example, facing side surfaces 313 of adjacent engagement elements 30 are non-parallel, i.e. at an angle to each other, defining a widening gap 310. With this configuration, side surfaces 313 often will substantially entirely engage each other upon bending and/or twisting of jacket 10, completely closing gap 310.

In FIG. 13, facing side surfaces 323 of adjacent elements 30 are parallel, defining a substantially straight-walled gap 320. Upon relative movement of these engagement elements, side surfaces 323 will contact each other toward the upper end of gap 320, partially closing gap 320 but leaving a substantially triangular opening.

Gap 330 of FIG. 14 is defined by opposite curved side surfaces 333 of adjacent elements 30. Upon relative movement, curved surfaces 333 will engage each other below the faces of engagement elements 30, again partially closing gap 330 but leaving an open space. The FIG. 14 embodiment is possibly more difficult to mold than previous embodiments, but may present advantages for certain applications.

Figure 15:
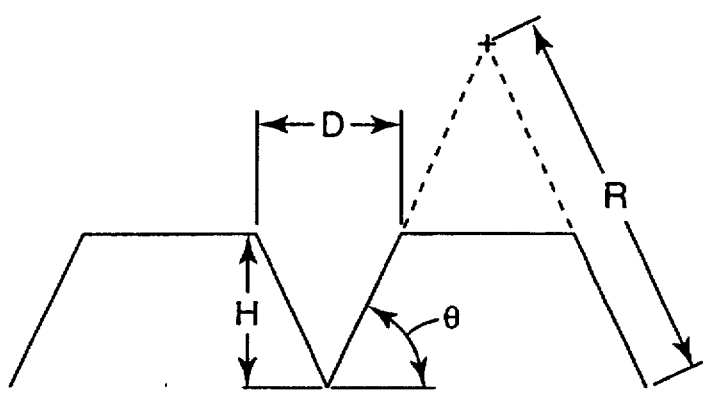
FIG. 15 is side view of a gap according to an embodiment of the invention, for describing bend radius calculation.

For a tapered gap geometry, as shown in FIG. 15, it will be apparent that bend radius $$R = \frac{L}{2\cos\theta} = \frac{L}{2\cos\left(\operatorname{atan}\left(\frac{2H}{D}\right)\right)},$$

where L is the distance between adjacent gaps, H is gap height, D is gap width at the top surface of the jacket, and θ is the angle defined by the element side surface. For a straight-walled gap, it will be apparent that bend radius $$R = \left[ \frac{L^2}{2(1-\cos\phi)} \right]^{1/2},$$

where L is the length between adjacent gaps and ø is the angle between the uppermost edges of the engagement elements taken with respect to the bottom center of the gap.

For typical fiber-optic applications, bend radius R preferably ranges from about ⅛ to about 2 inches, depending upon cable size, transmission rate, wavelength, and other factors. According to one embodiment, the thickness of engagement elements 30 down to underlying web structure 80 is approximately 40 mils, and underlying web structure 80 itself is approximately 20 mils thick. Of course, other bend radii and larger jacket sizes may be preferred for other applications using larger cables, including non-fiber-optic applications.

Whatever the bend radius size, gap geometry is chosen to define a desired bend radius R. Gap geometry can vary with direction. For example, jacket 10 can have different bend radii in the longitudinal and transverse directions, if desired. Gap geometry can also differ to a certain extent along a single direction, i.e. the bend radius can change along the length of jacket 10. Twist angle will be affected in accordance with the selected bend radius.

It is more important to define gap geometry precisely with larger jacket sizes. As jacket size and thus gap size decrease, gap geometry can be approximated down to straight sides without significantly affecting bend radius.

Figure 16:
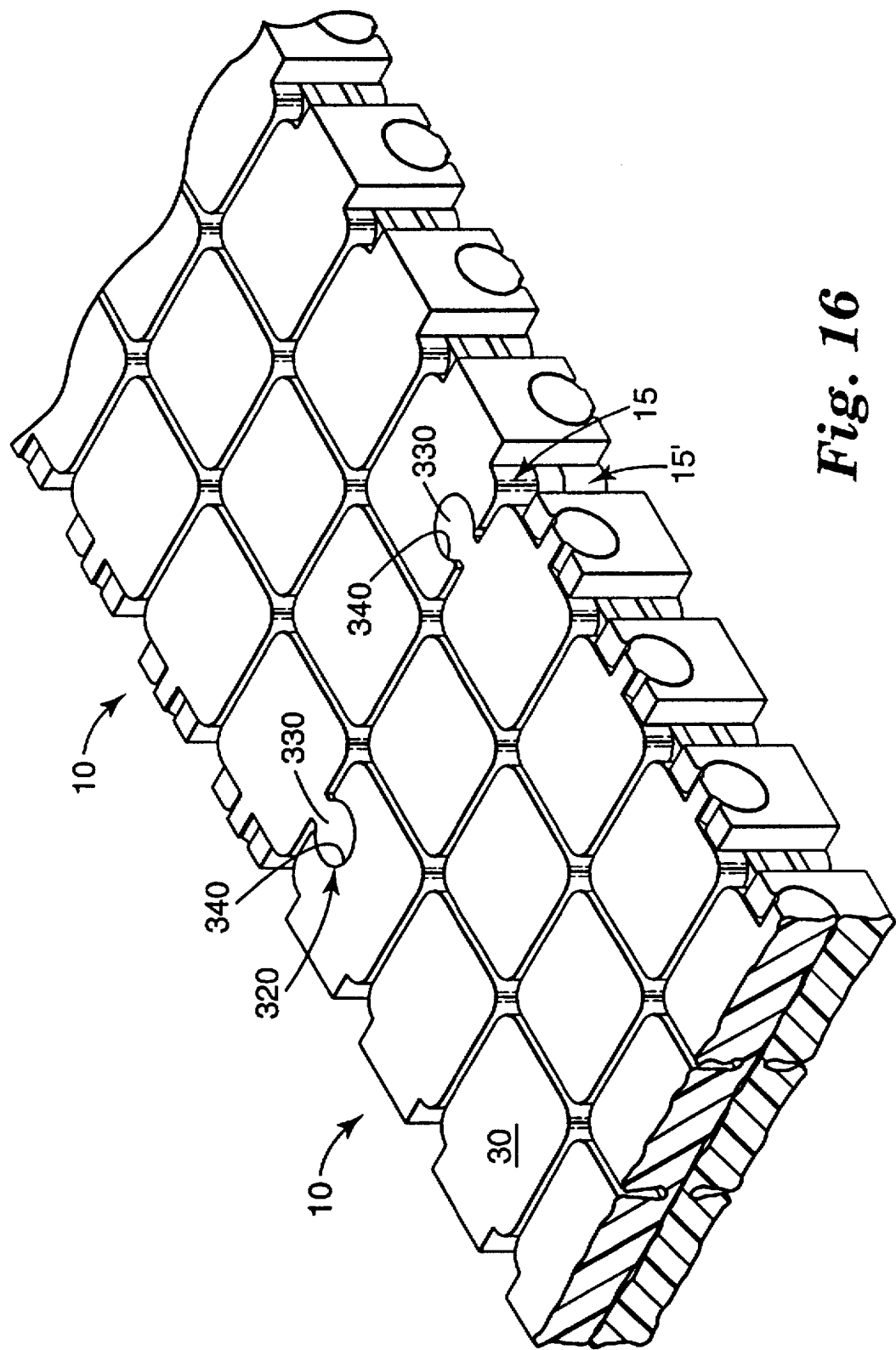
FIG. 16 is a perspective view of multiple control jackets connected together end-to-end, according to an embodiment of the invention.

As shown in FIG. 16, multiple jackets 10 can be strung together end-to-end to form a composite protective jacket of any desired length. Adjacent jackets 10 together form tongue-and-groove joints 320 for securing the jackets to each other. Groove members 340 receive protruding tongue members 330, and members 330, 340 preferably extend the entire height of jacket portions 15, 15' to provide the most secure connection possible. Alternatively, joints 320 can assume more of a ball-and-socket configuration and be disposed at mid-height along elements 30. Further, although the illustrated embodiment includes two joints 320, a third joint or multiple additional joints can be provided, based for example on the number of engagement elements in each transverse column 70. Other locations and types of joints will be apparent to one of ordinary skill.

Jacket 10 is preferably formed of a material that readily allows bending, e.g., at hinges 90 and/or 280, but also has high compressive rigidity. The material should also be relatively lightweight and inexpensive, and polymeric materials such as thermoplastics or thermoplastic elastomers are preferred. Polypropylene is one material especially suitable for use, although, of course, other materials, such as, for example, polyethylene, polycarbonate, polyurethanes such those available from B.F. Goodrich under the trade designation ESTANE and from Monsanto under the trade designation SANTOPRENE, co-polyesters such as those available from General Electric under the trade designation LO-MOD or those available from DuPont under the trade designation HYTREL, silicone materials such as silicone/rubber or silicone/elastomer products, PVC vinyl polymers such as those available from B.F. Goodrich under the trade designation GEON, styrenics such as those available from Shell under the trade designation KRATON, and other engineering polymers/plastics may be used.

Fillers may be added to the polymers to provide a material with a desired combination of strength and flexibility. The types of fillers which may be used may vary widely depending on the intended application, and examples of suitable fillers include, for example, fibers such as Kevlar, nylon, carbon, and glass, metal wires or particles and ceramic materials. The fillers may be randomly arranged, or may be formed into a matrix or a web-like array.

Jacket portions 15, 15' can be formed in a variety of ways. For example, each portion can be molded and thus entirely formed of one piece. Even the embodiment of FIGS. 7–9, in which the two jacket portions 15, 15' are hinged together, can be molded and thus formed of one piece. Jacket portions 15, 15' can be extruded over a fiber tape assembly, or jacket portions 15, 15' can even replace the tape layers of the tape assembly. In this case, the polypropylene or other material preferably would be extruded directly over the fibers, and, e.g., embossing wheels or other elements used to form the gaps (and thus define the engagement elements themselves.). Alternatively, the gaps can be cut into a pre-formed jacket blank.

While the invention has been described with reference to specific embodiments, the description is illustrative and is not to be construed as limiting the scope of the invention. For example, features of the various described control jacket embodiments can be mixed and matched to suit a particular application. For example, the gaps of FIGS. 12–14 can be used with the adhesive of FIG. 3 or the zipper fasteners of FIGS. 1–3. According to the invention, a wide variety of lines can be protected in a wide variety of physical environments and locations. Various other modifications and changes may occur to those skilled in the art without departing from the spirit and scope of the invention as defined in the following claims.

What is claimed is:

1. A control jacket for housing a line and limiting the amount of bending and twisting of the line, the control jacket comprising:

a plurality of engagement elements disposed in a multi-dimensional matrix to substantially cover the line;

a plurality of gaps separating adjacent engagement elements of the matrix; and structure interconnecting the engagement elements to permit movement of adjacent engagement elements into engagement with each other, substantially closing the gaps, upon bending and twisting of the control jacket, the engagement elements limiting the amount of bending and twisting of the control jacket to prevent damage to the line.

2. The control jacket of claim 1, wherein each engagement element includes a substantially polygonal face forming a portion of an outer surface of the control jacket.

3. The control jacket of claim 1, wherein each engagement element is in the shape of a frustum of a pyramid.

4. The control jacket of claim 1, wherein the multi-dimensional matrix of engagement elements includes rows and columns of engagement elements.

5. The control jacket of claim 4, wherein adjacent engagement elements in the same column engage each other when the control jacket is twisted.

6. The control jacket of claim 5, wherein adjacent engagement elements in the same row engage each other when the control jacket is bent in an out-of-plane direction.

7. The control jacket of claim 1, wherein:

the control jacket defines a longitudinal direction and two transverse directions perpendicular to the longitudinal direction, one of the two transverse directions being an in-plane transverse direction and the other of the two transverse directions being an out-of-plane transverse direction;

longitudinally adjacent engagement elements at least partially close their respective intervening gaps and engage each other upon out-of-plane bending of the control jacket along the longitudinal direction; and in-plane transversely adjacent engagement elements at least partially close their respective intervening gaps and engage each other upon out-of-plane bending of the control jacket along the in-plane transverse direction.

8. The control jacket of claim 1, wherein each engagement element includes side surfaces, facing side surfaces of adjacent engagement elements being parallel to each other.

9. The control jacket of claim 1, wherein each engagement element includes side surfaces, facing side surfaces of adjacent engagement elements being at an angle to each other.

10. The control jacket of claim 1, wherein the structure interconnecting the engagement elements includes a plurality of hinges interconnecting adjacent engagement elements.

11. The control jacket of claim 1, wherein the control jacket is constructed to substantially cover a line comprising substantially flat ribbon cable.

12. The control jacket of claim 1, wherein the control jacket comprises two halves, each half including a multi-dimensional matrix of engagement elements.

13. The control jacket of claim 12, wherein the control jacket includes a hinge for pivoting the two halves with respect to each other to open and close the control jacket along its length, allowing insertion of the line along the length of the control jacket.

14. A control jacket for housing a line, the control jacket defining a longitudinal direction and being openable along the longitudinal direction to permit insertion of the line into the control jacket, the control jacket comprising:

a plurality of spaced engagement elements separated by intervening gaps, the spaced engagement elements being movable to engage each other and at least partially close the intervening gaps to limit bending of the control jacket and to prevent damage to the line; and structure operably coupled with the plurality of spaced engagement elements to allow opening of the control jacket along the longitudinal direction for insertion of the line and to allow closing of the control jacket along the longitudinal direction for securement of the line within the control jacket.

15. The control jacket of claim 14, wherein the spaced engagement elements are movable to engage each other and at least partially close the intervening gaps to limit twisting of the control jacket.

16. The control jacket of claim 14, wherein the structure to allow opening and closing of the control jacket includes a fastening mechanism to hold the control jacket closed along the longitudinal direction.

17. The control jacket of claim 16, wherein the fastening mechanism includes a plurality of interlocking members operably coupled with the spaced engagement elements and extending longitudinally along the control jacket, the interlocking members engaging and interlocking with each other to hold the control jacket closed and disengaging from each other to allow the control jacket to open.

18. The control jacket of claim 17, wherein the fastening mechanism comprises a zipper extending longitudinally along the control jacket, the interlocking members comprising interlocking teeth of the zipper.

19. The control jacket of claim 18, wherein the interlocking members are one-piece with corresponding engagement elements.

20. The control jacket of claim 18, wherein the zipper is a first zipper, further wherein the fastening mechanism comprises a second zipper having interlocking teeth.

21. The control jacket of claim 17, wherein the structure to allow opening and closing of the control jacket includes a hinge.

22. The control jacket of claim 16, wherein the fastening mechanism extends along a side of the control jacket to permit movement of the line relative to and within the control jacket.

23. The control jacket of claim 16, wherein the fastening mechanism comprises a pair of fasteners arranged on opposite sides of the control jacket, the pair of fasteners being constructed to hold the control jacket closed along its edges and to permit movement of the line relative to and within the control jacket.

24. The control jacket of claim 14, further comprising two control jacket portions pivotally connected by the structure to allow opening and closing of the control jacket.

25. The control jacket of claim 24, wherein the structure to allow opening and closing of the control jacket comprises a hinge for pivoting the two control jacket portions relative to each other.

26. The control jacket of claim 24, wherein the two control jacket portions are substantially rectangular.

27. The control jacket of claim 16, wherein the fastening mechanism comprises an adhesive.

28. The control jacket of claim 14, wherein the control jacket comprises a polymeric material selected from the group consisting of polypropylene, polyethylene, and polycarbonate.

29. A control jacket for housing a line and limiting the amount of bending and twisting of the line, the control jacket comprising:

engagement means disposed in a multi-dimensional matrix for limiting bending and twisting movement of the control jacket and for substantially covering the line;

gap means for permitting movement of the engagement means into interengagement as the control jacket is bent and twisted, the engagement means at least partially closing the gap means to limit bending and twisting of the control jacket to prevent damage to the line;

opening means, operably coupled with the engagement means, for allowing the control jacket to open along a longitudinal direction for insertion of the line and for allowing the control jacket to close along the longitudinal direction for securement of the line within the control jacket; and fastening means, operably coupled with the engagement means, for holding the control jacket closed along the longitudinal direction.

30. The control jacket of claim 29, wherein the opening means comprises hinge means.

31. The control jacket of claim 29, wherein the opening means comprises interlocking means for selective interengagement longitudinally along the control jacket.

32. The control jacket of claim 29, wherein the fastening means comprises an adhesive.

33. A control jacket in combination with a line disposed within the control jacket, the control jacket limiting the amount of bending and twisting of the control jacket:

the control jacket comprising:

a plurality of engagement elements disposed in a multi-dimensional matrix to substantially cover the line;

a plurality of gaps separating adjacent engagement elements of the matrix; and structure interconnecting the engagement elements to permit movement of adjacent engagement elements into engagement with each other, substantially closing the gaps, upon bending and twisting of the control jacket, the engagement elements limiting the bending and twisting movement of the control jacket to prevent damage to the line.

34. The control jacket combination of claim 33, wherein the line comprises substantially flat ribbon cable.

35. The control jacket combination of claim 34, wherein the ribbon cable comprises fiber optic ribbon cable.

36. The control jacket combination of claim 33, wherein the line comprises at least one fiber optic cable.

37. The control jacket combination of claim 33, further comprising multiple interconnected control jackets disposed along the length of the line.

38. The control jacket combination of claim 33, wherein the control jacket is molded onto the line.

39. The control jacket combination of claim 33, wherein the control jacket is openable and closeable along its length to attach to and detach from the line at multiple points along its length.

40. The control jacket combination of claim 33, wherein the control jacket substantially encloses the line to shield it from environmental contamination.

41. The control jacket combination of claim 33, wherein at least one portion of the control jacket is adhered to the line to prevent the control jacket from moving down the line.

42. The control jacket combination of claim 41, wherein at least one portion of the control jacket is movable with respect to the line to substantially avoid build-up of shear forces between the control jacket and the line.

43. The control jacket of claim 1, wherein an end of the jacket is adhered to the line.

44. The control jacket of claim 1, wherein the jacket further comprises an area which adheres to a connector.

45. The control jacket of claim 44, wherein the area further comprises an adhesive.

* * * * *

UNITED STATES PATENT AND TRADEMARK OFFICE
CERTIFICATE OF CORRECTION

PATENT NO.: 5,764,839

DATED: Jun. 9, 1998

INVENTOR(S): Scott Anthony Igl, Gordon Dwight Henson and Nicholas Anthony Lee

It is certified that error appears in the above-identified patent and that said Letters Patent is hereby corrected as shown below:

On title page, item [54] and col. 1, line 1,
"RADUS" should read -- RADIUS --.

Col. 1, Line [22], "Jun. 10, 1996" should read — Jun. 7, 1996—

Signed and Sealed this

First Day of December, 1998

Attest:

Attesting Officer

BRUCE LEHMAN

Commissioner of Patents and Trademarks